US012603332B2

(12) United States Patent
Kim

(10) Patent No.: US 12,603,332 B2
(45) Date of Patent: Apr. 14, 2026

(54) BATTERY PACK COMPRISING CELL STACK STRUCTURE USING FLEXIBLE PRINTED CIRCUIT BOARD

(71) Applicant: LG ENERGY SOLUTION, LTD., Seoul (KR)

(72) Inventor: Jae Hyung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 589 days.

(21) Appl. No.: 17/633,615

(22) PCT Filed: Dec. 30, 2020

(86) PCT No.: PCT/KR2020/019415
§ 371 (c)(1),
(2) Date: Feb. 8, 2022

(87) PCT Pub. No.: WO2021/141322
PCT Pub. Date: Jul. 15, 2021

(65) Prior Publication Data
US 2022/0320601 A1 Oct. 6, 2022

(30) Foreign Application Priority Data
Jan. 8, 2020 (KR) ........................ 10-2020-0002530

(51) Int. Cl.
*H01M 10/42* (2006.01)
*H01M 50/284* (2021.01)
(Continued)

(52) U.S. Cl.
CPC ....... *H01M 10/425* (2013.01); *H01M 50/284* (2021.01); *H01M 50/519* (2021.01); *H01M 50/572* (2021.01); *H01M 2010/4271* (2013.01)

(58) Field of Classification Search
CPC .. H01M 10/425; H01M 10/42; H01M 50/284; H01M 50/519; H01M 50/572;
(Continued)

(56) References Cited

U.S. PATENT DOCUMENTS

2008/0081249 A1    4/2008   Kaneko
2009/0154048 A1*   6/2009   Jang .................... H01M 10/425
                                                 361/106
(Continued)

FOREIGN PATENT DOCUMENTS

JP         2004095357 A   *   3/2004
JP           4165586 B2      10/2008
(Continued)

OTHER PUBLICATIONS

English translation of JP 2004095357A—Battery clock consisting of non-aqueous electrolyte battery and battery pack of exchange equipment size; Sony Corp; Apr. 8, 2009 (Year: 2009).*
(Continued)

*Primary Examiner* — Adam J Francis
(74) *Attorney, Agent, or Firm* — Birch, Stewart, Kolasch & Birch, LLP

(57) ABSTRACT

Discussed are a battery pack including a cell stack structure using a flexible printed circuit board (FPCB), and more specifically, to a battery pack that forms various stack structures by connecting battery cells through an FPCB and stacking the battery cells in a desired stacked state. The battery pack includes at least two or more stacked battery cells; a flexible printed circuit board (FPCB) configured to electrically interconnect the battery cells; and a battery protection circuit configured to protect the battery cells, wherein the FPCB comprises a cell connection part connecting the battery cells in a predetermined connection state.

15 Claims, 2 Drawing Sheets

(51) Int. Cl.
 *H01M 50/519* (2021.01)
 *H01M 50/572* (2021.01)

(58) Field of Classification Search
 CPC ............. H01M 50/211; H01M 50/509; H01M 50/502; H01M 2010/4271; H01M 2200/00; H01R 11/09; H01R 12/592; H01R 12/29; H01R 12/707; H01R 12/70
 See application file for complete search history.

(56) References Cited

U.S. PATENT DOCUMENTS

| | | |
|---|---|---|
| 2010/0101081 A1 | 4/2010 | Kim |
| 2011/0104519 A1 | 5/2011 | Ahn |
| 2011/0151316 A1 | 6/2011 | Yoon |
| 2013/0011700 A1 | 1/2013 | Park et al. |
| 2013/0266823 A1 | 10/2013 | Lee |
| 2013/0302651 A1 * | 11/2013 | Kim .................... H01M 10/425 |
| | | 429/7 |
| 2015/0333547 A1 * | 11/2015 | Na .......................... H02H 7/18 |
| | | 361/93.1 |
| 2016/0372796 A1 * | 12/2016 | Nishihara ........... H01M 50/519 |
| 2019/0198944 A1 | 6/2019 | Tanabe et al. |
| 2020/0220232 A1 * | 7/2020 | Von Hofen ......... H01M 50/569 |
| 2021/0203012 A1 * | 7/2021 | Chen ................... H01M 50/569 |

FOREIGN PATENT DOCUMENTS

| | | | | | |
|---|---|---|---|---|---|
| JP | 4250932 | B2 | 4/2009 | | |
| JP | 2019-67671 | A | 4/2019 | | |
| JP | 2019-114464 | A | 7/2019 | | |
| KR | 10-2009-0026650 | A | 3/2009 | | |
| KR | 10-2009-0064961 | A | 6/2009 | | |
| KR | 10-2011-0072272 | A | 6/2011 | | |
| KR | 10-1084855 | B1 | 11/2011 | | |
| KR | 10-1093282 | B1 | 12/2011 | | |
| KR | 10-2013-0006279 | A | 1/2013 | | |
| KR | 10-2013-0113975 | A | 10/2013 | | |
| KR | 10-1474741 | B1 | 12/2014 | | |
| KR | 10-2016-0070855 | A | 6/2016 | | |
| KR | 20160070855 | A | * | 6/2016 | |
| KR | 10-2018-0045794 | A | 5/2018 | | |
| WO | WO 2004/093221 | A2 | 10/2004 | | |
| WO | WO-2019059133 | A1 | * | 3/2019 | ........... H01M 50/20 |

OTHER PUBLICATIONS

Extended European Search Report dated May 6, 2022 for Application No. 20912400.7.
International Search Report for PCT/KR2020/019415 mailed on Apr. 8, 2021.

* cited by examiner

CELL ARRANGEMENT STEP —S100

TERMINAL ACCESS PART FORMING STEP —S200

CELL CONNECTION PART FORMING STEP —S300

PROTECTION CIRCUIT CONNECTION PART FORMING STEP —S400

CELL STACKING STEP —S500

PROTECTION CIRCUIT CONNECTION STEP —S600

PROTECTION CIRCUIT MOUNTING STEP —S700

BATTERY PACK COMPRISING CELL STACK STRUCTURE USING FLEXIBLE PRINTED CIRCUIT BOARD

TECHNICAL FIELD

The present invention relates to a battery pack, and more specifically, to a battery pack made of a cell stack structure using a flexible printed circuit board (FPCB).

BACKGROUND ART

In general, batteries applied/mounted to devices requiring rechargeable electrical storage devices such as portable electronic devices and electric vehicles electrically connect a plurality of battery cells connected in series or in parallel, and a battery protection circuit for extending the life of the battery cells and protecting the battery from abnormal operation form one battery pack.

In the method of manufacturing such a battery pack, if trying to connect battery cells in series/parallel, a method of mounting the battery protection circuit module on a hard printed circuit board PCB and connecting between battery cells and connecting the battery cells and the protection circuit module through the PCB was used.

However, in the case of using such a method, there is a problem that the connection structure of battery cells is limited by the shape of the PCB through the PCB made of a hard material.

In order to solve this problem, a method of connecting battery cells in an arbitrary stack structure and forming a separate protection circuit module was used.

However, when forming a separate protection circuit module, due to the complicated process of welding a nickel wire for each electrode terminal of each battery cell and connecting it to the protection circuit module, it has a problem of lowering productivity.

(Patent Document 1) KR10-2009-0026650 A

DISCLOSURE

Technical Problem

The present invention is to solve the above-described problem, and to provide a battery pack that forms various stack structures through a cell connection structure using a flexible printed circuit board (FPCB).

Technical Solution

According to an embodiment of the present invention, a battery pack includes: at least two or more stacked battery cells; a flexible printed circuit board (FPCB) configured to electrically interconnect the battery cells; and a battery protection circuit configured to protect the battery cells, wherein the FPCB includes a cell connection part connecting the battery cells in a predetermined connection state.

Specifically, the FPCB includes: a terminal access part connected to each electrode terminal of the battery cells; a cell connection part configured to connect the terminal access parts in a predetermined connection state to connect the battery cells in a predetermined connection state; and a protection circuit connection part configured to electrically connect the FPCB and the battery protection circuit.

Moreover, the FPCB forms a bending space that is bent and a non-bending space that is not bent according to the stacked state of the battery cells, wherein the battery protection circuit is mounted in the non-bending space formed on the FPCB.

Herein, the cell connection part is formed in a form of a connection path pattern connecting the terminal access parts in a predetermined connection state, wherein the connection path pattern is changed according to a connection state to which the battery cells are connected.

According to the present invention, a method of manufacturing a battery pack includes: a cell arrangement step of arranging battery cells in a predetermined arrangement so that each electrode terminal of at least two battery cells faces a flexible printed circuit board (FPCB); a terminal access part forming step of welding the electrode terminals of the battery cells to the FPCB to form a terminal access part, which is a connection area with each battery cell, on the FPCB; a cell connection part forming step of forming a cell connection part connecting the terminal access parts to the FPCB in a predetermined connection state so as to connect the battery cells in a predetermined connection state; a protection circuit connection part connection step of connecting a protection circuit connection part connecting the battery cells connected to the FPCB and a battery protection circuit to the FPCB; a cell stacking step of stacking the battery cells in a stacked state in which the battery cells are to be stacked while connecting the battery cells in a predetermined connection state through the terminal access part forming step and the cell connection part forming step; and a protection circuit connection step of connecting the battery protection circuit to the protection circuit connection part connected to the FPCB in the protection circuit connection part connection step, and interconnecting the battery cells and the battery protection circuit.

Moreover, according to the state of stacking the battery cells in the cell stacking step, the FPCB forms a bending space that is bent and a non-bending space that is not bent, wherein the method further includes a protection circuit mounting step of mounting the battery protection circuit connected in the protection circuit connection step in the non-bending space formed on the FPCB.

Furthermore, the forming of the cell connection part in the cell connection part forming step includes forming a connection path pattern connecting the terminal access parts formed on the FPCB.

Herein, the cell connection part formed in the form of the connection path pattern varies depending on the connection state to which the battery cells are to be connected.

Furthermore, the cell arrangement step includes arranging the battery cells to face each other based on the FPCB.

Moreover, the cell arrangement step includes arranging the battery cells in a line based on the FPCB.

Advantageous Effects

The present invention achieves a connection structure between battery cells by using a flexible printed circuit board (FPCB) instead of a conventional hard material printed circuit board (PCB), so that by improving the degree of freedom in the connection structure of battery cells, it is possible to manufacture a battery pack having various stack structures.

Furthermore, since it is possible to change the shape of the battery pack in various ways, the shape can be applied to a wider variety of products.

MODE FOR INVENTION

Figure 1:
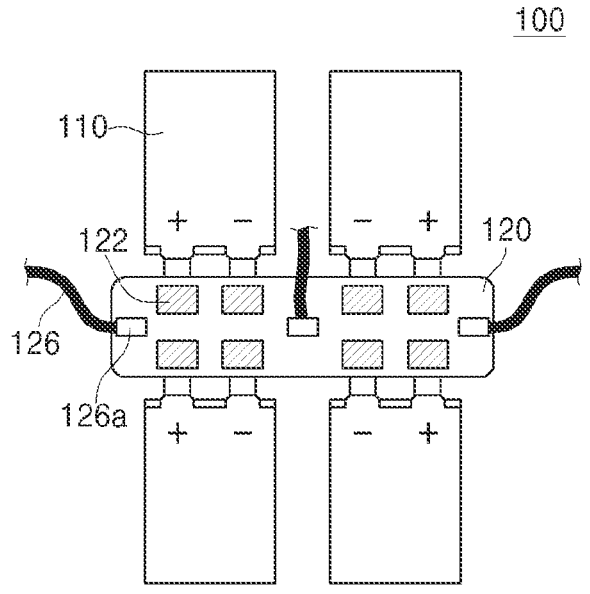
FIG. 1 is a diagram schematically showing an example of a connection structure of battery cells using a flexible printed circuit board (FPCB) according to the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Terms including ordinal numbers, such as first and second, may be used to describe various elements, but the elements are not limited by the terms. The above terms are used only to distinguish one component from another. For example, a first component may be referred to as a second component and vice versa without departing from the scope of the present invention. The terms used in the present application are used only to describe specific embodiments, and are not intended to limit the present invention. The terms of a singular form may include plural forms unless otherwise specified.

Throughout the specification, when one part is "connected" to another part, this includes not only "directly connected" cases, but also "electrically connected" cases with other elements therebetween. In addition, when a certain part "includes" a certain component, it means that other components may be further included rather than excluding other components unless otherwise stated. As used throughout the present specification, the term "~ing step" or "a step of ~ing" does not mean "a step for ~ing".

As for terms used in the present invention, general terms that are currently widely used as possible are selected while considering functions in the present invention, but this may vary depending on the intentions or precedents of those skilled in the art, and the emergence of new technologies. In addition, in certain cases, there are terms arbitrarily selected by the applicant, and in this case, the meaning of the terms will be described in detail in the description of the corresponding invention. Therefore, the terms used in the present invention should be defined based on the meaning of the term and the overall contents of the present invention, not a simple name of the term.

Hereinafter, the present invention will be described in detail with reference to the drawings.

1. Battery Pack According to Present Invention

The battery pack 100 according to the present invention includes various cell stack structures, and may be configured to include the following configurations.

1.1. Battery Cell 110

The battery pack 100 according to the present invention is configured to include at least two or more battery cells.

The battery cells are electrically connected to each other in a predetermined connection state through a flexible printed circuit board (FPCB) to be described later, and may be stacked to form a predetermined stack structure.

Figure 2:
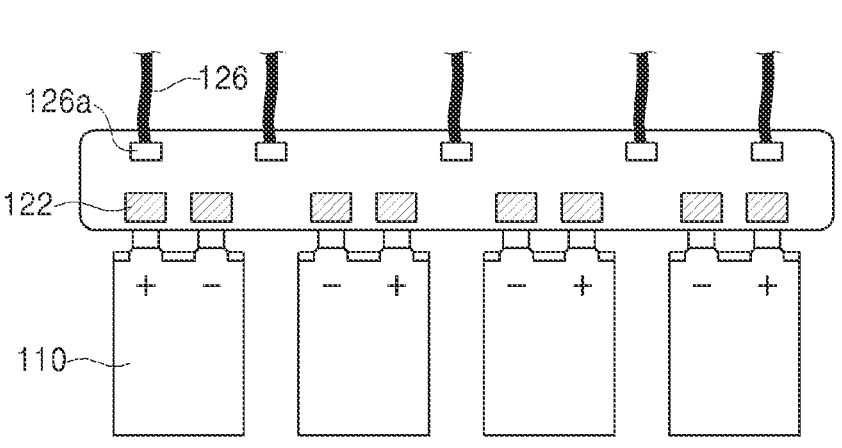
FIG. 2 is a diagram schematically showing another example of a connection structure of battery cells using an FPCB according to the present invention.

In one embodiment, as shown in FIG. 1, the battery cells may be arranged in a form facing each other based on an FPCB 120 to be described later, and may be stacked in a manner that is folded in the vertical and horizontal directions, and as shown in FIG. 2 in another embodiment, may be arranged in a line with respect to the FPCB 120 and may be folded in either direction of the left and right directions or may be stacked in a rolling manner.

However, the present invention is not limited thereto, and it is possible to electrically interconnect battery cells through the FPCB 120 to be described later and implement various stack structures in a desired shape.

In addition, although four battery cells 110 are shown to be connected to one FPCB 120 in FIGS. 1 and 2, the number of battery cells 110 is not limited thereto, and the number of battery cells 110 may vary as necessary.

1.2. Fpcb 120

The FPCB is a type of printed circuit board (PCB) that is made of a soft material and has a characteristic of being flexibly bent, and is a configuration for electrically interconnecting the battery cells 110, and may include the following configuration.

A. Terminal Access Part 122

The terminal access part is a configuration connected to the electrode terminals of the battery cells 110, and may be formed by welding the positive/negative terminals of each battery cell to the FPCB 120.

More specifically, on the basis of the FPCB 120, for example, in a state in which the battery cells 110 are arranged to face each other as shown in FIG. 1 or in a line as shown in FIG. 2, the terminal access part may be formed by welding the positive/negative terminals of each battery cell 110 to the FPCB 120.

That is, the terminal access part refers to a connection area between the electrode terminal of the battery cell and the FPCB 120, and as such a terminal access part is formed, each battery cell 110 is electrically connected to the FPCB 120.

Accordingly, as shown in FIGS. 1 and 2, two terminal access parts are provided for each battery cell 110.

B. Cell Connection Part 124

The cell connection part is a configuration for connecting the terminal access parts 122 connected to the electrode terminals of each battery cell to connect the battery cells in a predetermined connection state.

Figures 3, 4:
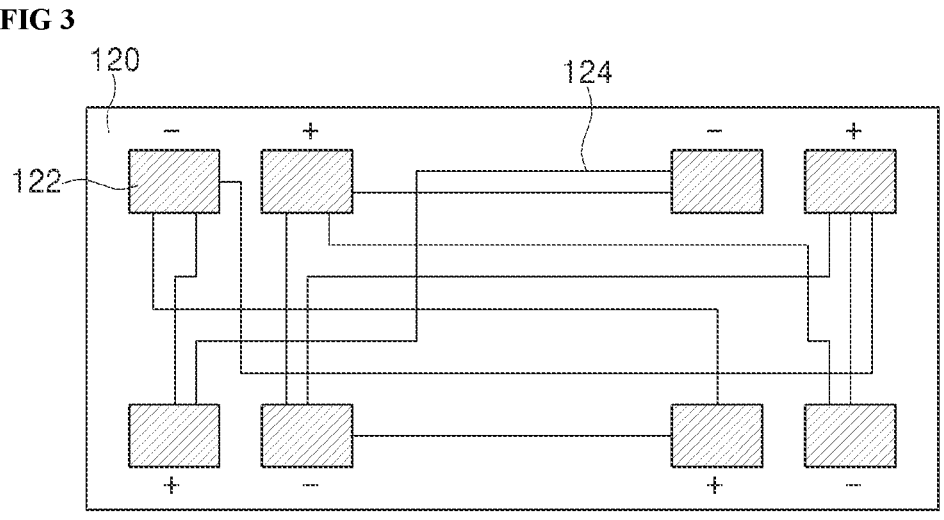
FIG. 3 is a schematic diagram illustrating an example of a cell connection part.
FIG. 4 is a flowchart schematically showing a method of manufacturing a battery pack comprising a cell stack structure using an FPCB according to the present invention.

Specifically, the cell connection part is a configuration for connecting the battery cells 110 connected to the FPCB 120 through the terminal access part 122 in a serial/parallel connection state, and for example, as shown in FIG. 3, the cell connection part is implemented in the form of a connection path pattern connecting the terminal access parts 122, and the terminal access parts 122 are connected according to the connection path pattern, so that the battery cells 110 may be electrically connected in a serial/parallel connection state according to the connection path pattern.

The cell connection part shown in FIG. 3 schematically shows an example for understanding its function, and this cell connection part may be flexibly changed according to the connection state in which the battery cells 110 connected to the FPCB 120 through the terminal access part 122 are to be connected.

That is, by forming a cell connection part on the FPCB 120 according to the state in which the battery cells 110 are to be connected, the battery cells 110 can be electrically interconnected in a desired connection state without being limited by the stack structure or arrangement state of the battery cells 110.

C. Protection Circuit Connection Part 126

The protection circuit connection part is a configuration that electrically connects the FPCB 120 and a battery protection circuit (not shown), and may be formed of, for example, a wire as shown in FIGS. 1 and 2.

When the protection circuit connection part is composed of wires, by connecting one end to the FPCB 120 to form a protection circuit connection part connection area 126*a*, and connecting the other end to a battery protection circuit (not shown), the FPCB 120 and the battery protection circuit (not shown) may be electrically interconnected.

The battery cells 110 electrically interconnected in a predetermined connection state are connected to a battery protection circuit (not shown) by this protection circuit connection part through the terminal access part 122 and the cell connection part 124 of the FPCB 120, and through this, a battery protection circuit (not shown) to be described later monitors the voltage state of the battery cells 110, thereby protecting the battery cells 110 from overcharge, overdischarge, overcurrent, and short circuit.

As shown in FIGS. 1 and 2, the number of protection circuit connection parts may vary according to the number or arrangement of the battery cells 110 connected to the FPCB 120.

Meanwhile, the protection circuit connection part connection area 126*a* means a location/area connected to the protection circuit connection part to the FPCB 120, and may be formed in consideration of a location at which the battery protection circuit (not shown) can perform a function of monitoring the voltage state of the battery cells 110 well according to the arrangement state of the battery cells 110 connected to the FPCB 120.

D. Bending Space/Non-Bending Space (not Shown)

As described above, in the present invention, since the battery cells 110 are electrically interconnected through the terminal access part 122 and the cell connection part 124 of the FPCB 120 having a flexible and well bent characteristic, the battery pack 100 may be configured by stacking the battery cells 110 in a desired shape by utilizing the characteristics of the FPCB 120.

At this time, based on the FPCB 120, for example, if the battery cells 110 are folded in the vertical, left and right directions or stacked in a form such as rolling, according to the stacked structure, a bending space and a non-bending space are formed in the FPCB 120, and as an example for improving the miniaturization and weight reduction of the battery pack, a battery protection circuit (not shown) described below may be mounted in a non-bending space that is not bent.

1.3. Battery Protection Circuit (not Shown)

The battery protection circuit is a configuration that protects the battery cells 110, and specifically, may protect the battery cells 110 from abnormal operations including overcharge, overdischarge, overcurrent, and short circuit of the battery cells 110. Such a battery protection circuit is connected to the FPCB 120 through the protection circuit connection part 126 and electrically connected to the battery cells 110 to monitor the voltage state of the battery cells 110 so that the battery can be protected by preventing the occurrence of danger problems such as overcharge, overdischarge, overcurrent, and short circuit.

This battery protection circuit, as described above, as an embodiment for improving the miniaturization and weight reduction of the battery pack, may be mounted in a non-bending space formed in the FPCB 120 according to the stack structure of the battery cells 110.

In this case, in configuring the battery pack 100, unlike the conventional battery pack, since it is mounted in the space formed in the FPCB 120 according to the stack structure of the battery cells 110 without having to provide a space for mounting a separate battery protection circuit (not shown), it is possible to achieve more improved miniaturization and weight reduction of the battery pack.

As described above, the present invention connects the battery cells through an FPCB having a flexible and well bent characteristic, and since battery cells can be connected in a connection state to be connected, and it is possible to stack them in a desired stack structure, the application efficiency can be improved because the battery pack can be variously implemented in a required form.

2. Method of Manufacturing Battery Pack According to Present Invention (Refer to FIG. 4)

The method of manufacturing a battery pack having various cell stack structures according to the present invention includes stacking the battery cells 110 in a desired shape by electrically interconnecting the battery cells 110 through an FPCB 120 having a flexible and well bent characteristic and thus, may include the following steps.

2.1. Cell Arrangement Step S100

The cell arrangement step is a step of arranging at least two battery cells 110 to be connected in a predetermined arrangement with respect to the FPCB 120.

For example, as shown in FIG. 1, the battery cells 110 may be arranged to face each other based on the FPCB 120, or may be arranged in a row as shown in FIG. 2. At this time, as shown in FIGS. 1 and 2, the electrode terminals of each battery cell 110 should be disposed to face the FPCB 120.

By arranging the electrode terminals of the battery cells 110 to face the FPCB 120 in this way, a terminal access part forming step S200 connecting the electrode terminals of each battery cell 110 to the FPCB 120 can be performed.

2.2. Terminal Access Part Forming Step S200

The terminal access part forming step is a step of welding and connecting each electrode terminal of at least two battery cells 110 to the FPCB 120 and forming a terminal access part 122 that is a connection area between the FPCB 120 and each battery cell 110.

More specifically, in a state in which at least two or more battery cells 110 are arranged in a predetermined shape with respect to the FPCB 120 through the cell arrangement step S100, by welding the positive/negative terminals of each battery cell 110 to the FPCB 120 to form the terminal access part 122, the corresponding battery cell 110 can be electrically connected to the FPCB 120.

In this way, since the terminal access part 122 is formed by being connected to the positive/negative terminals of each battery cell 110, respectively, as shown in FIGS. 1 and 2, two terminal access parts 122 may be configured for each battery cell 110.

The terminal access part 122 may also vary in an arrangement shape or number according to the arrangement state or number of battery cells 110 in the FPCB 120.

As an embodiment, as shown in FIG. 1, when the battery cells 110 are arranged to face each other based on the FPCB 120, each of the terminal access parts 122 corresponding to the opposite battery cells 110 may also be formed to face each other.

As another embodiment, as shown in FIG. 2, when the battery cells 110 are arranged in a line based on the FPCB 120, each terminal access part 122 corresponding to each of the battery cells 110 may also be formed in a line arrangement.

FIGS. 1 and 2 illustrate that four battery cells 110 are connected to one FPCB 120, but the present invention is not limited thereto, and the number of battery cells 110 may vary as necessary, and accordingly, the number of terminal access parts 122 formed in the terminal access part forming step may also vary.

2.3. Cell Connection Part Forming Step S300

The cell connection part forming step is a step of forming a cell connection part 124 connecting the terminal access parts 122 formed in the FPCB 120 through the terminal access part forming step S200 in order to connect the battery cells 110 in a predetermined connection state.

Specifically, for example, as shown in FIG. 3, the cell connection part 124 may be formed in the form of a connection path pattern connecting the terminal access parts 122 formed on the FPCB 120. As the cell connection part 124 is formed, since the terminal access parts 122 are connected in a connected state according to the cell connection part 124, the battery cells 110 may be electrically connected to each other in a connected state according to the cell connection part 124.

The cell connection part shown in FIG. 3 schematically shows an example for understanding its function, and the cell connection part formed in the cell connection part forming step may be flexibly changed according to the connection state in which battery cells are to be connected.

That is, by forming a cell connection part on the FPCB 120 according to the state in which the battery cells 110 are to be connected, the battery cells 110 can be electrically interconnected in a desired connection state without being limited by the stack structure or arrangement state of the battery cells 110.

2.4. Protection Circuit Connection Part Connection Step S400

The protection circuit connection part connection step is a step of connecting the protection circuit connection part 126, which is a connection structure between the battery cells 110 and the battery protection circuit (not shown), to the FPCB 120 in order to connect the battery cells 110 electrically interconnected through the FPCB 120 by the terminal access part forming step S200 and the cell connection part forming step S300 to a battery protection circuit (not shown).

As described above, the protection circuit connection part 126 may be formed of, for example, a wire. In this case, the protection circuit connection part connection step S400 may consist of connecting one end of a wire to the FPCB 120 and connecting the other end to the battery protection circuit (not shown) through the protection circuit connection step S500 described later, so that electrical connection between the battery cells 110 and the battery protection circuit (not shown) connected in a predetermined connection state through the terminal access part 122 and the cell connection part 124 of the FPCB 120 may be made.

Here, when connecting the protection circuit connection part 126 to the FPCB 120 in the protection circuit connection part connection step, this connection may be made in consideration of the location where the battery protection circuit (not shown) can perform a function of monitoring the voltage state of the battery cells 110 well according to the arrangement and number of battery cells 110 connected to the FPCB 120.

2.5. Cell Stacking Step S500

The cell stacking step is a step of stacking the battery cells 110 in a predetermined stack structure in a state in which the battery cells 110 are connected in a predetermined connection state through the terminal access part forming step S200 and the cell connection part forming step S300.

Since the battery cells 110 are electrically connected to each other in a predetermined connection state through the FPCB 120 in the above-described steps S100 to S400, the FPCB 120 may stack the battery cells 110 in a desired stack structure by using the characteristic of being flexible and bent well.

For example, as shown in FIG. 1, when the battery cells 110 are arranged and connected to face each other based on the FPCB 120, the battery cells 110 may be stacked in a manner that is folded in the vertical and horizontal directions.

As another example, when the battery cells 110 are arranged and connected in a row based on the FPCB 120 as shown in FIG. 2, the battery cells 110 may be stacked by folding or rolling in one of the left and right directions.

Since the battery cells 110 are electrically connected to each other in a connected state according to the cell connection part 124 by the cell connection part forming step S300 formed in the cell connection part forming step S300, in the stacking of the battery cells 110 in the cell stacking step S500, it is possible to stack the battery cells 110 in a desired shape without limiting a connection state or an arrangement state between the battery cells 110.

2.6. Protective Circuit Connection Step S600

The protection circuit connection step is a step of connecting a battery protection circuit (not shown) to the protection circuit connection part 126 connected to the FPCB 120 through the protection circuit connection part connection step S400.

In this protection circuit connection step, when the protection circuit connection part 126 is composed of a wire, in a state in which one end is connected to the FPCB 120 through the protection circuit connection part connection step S400, the other end is connected to the battery protection circuit (not shown).

In this way, by interconnecting the battery cells 110 and the battery protection circuit (not shown) through the protection circuit connection step, a battery protection circuit (not shown) may monitor the voltage state of the battery cells 110, and through this, it is possible to protect the battery cells 110 from abnormal operations including overcharge, overdischarge, overcurrent, and short circuit.

2.7. Protection Circuit Mounting Step S700

The method of manufacturing a battery pack having various cell stack structures according to the present invention may further include the protection circuit mounting step of mounting a battery protection circuit (not shown) connected in the protection circuit connection step S600.

As described above, in the present invention, the battery cells 110 are electrically interconnected through the terminal access part 122 and the cell connection part 124 of the FPCB 120 having a flexible and well bent characteristic, so that using the characteristics of the FPCB 120, the battery cells 110 may be stacked in a desired shape through the cell stacking step S400.

At this time, in the cell stacking step S500, based on the FPCB 120, for example, when the battery cells 110 are folded or rolled up and down in the horizontal direction, according to the stack structure, a bending space that is bent and a non-bending space that is not bent are formed in the FPCB 120, and as an example for improving the miniaturization and weight reduction of the battery pack, the protection circuit mounting step S700 of mounting the battery protection circuit in a non-bending space may be performed.

That is, the protection circuit mounting step S700 may be performed by mounting the battery protection circuit in a non-bending space formed on the FPCB 120 through the cell stacking step S500, and through these steps, the battery pack can be made smaller and lighter.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

What is claimed is:

1. A battery pack comprising:

at least two or more stacked battery cells;

a flexible printed circuit board (FPCB) configured to electrically interconnect the battery cells; and a battery protection circuit configured to protect the battery cells, wherein the FPCB comprises:

a cell connection part connecting the battery cells in a predetermined connection state;

terminal access parts respectively connected to each electrode terminal of the battery cells; and protection circuit connection part connection areas configured to electrically connect the FPCB and the battery protection circuit through protection circuit connection parts, respectively, wherein a number of the protection circuit connection parts vary according to a number or an arrangement of the at least two or more stacked battery cells that are connected to the FPCB, and locations and a number of the protection circuit connection part connection areas vary according to a location of the battery protection circuit or the arrangement of the at least two or more stacked battery cells that are connected to the FPCB, wherein the cell connection part is formed in a form of a connection path pattern connecting the terminal access parts in the connection state, and wherein the cell connection part extending from at least one of the terminal access parts includes at least three line connections that connect to at least three other terminal access parts, respectively.

2. The battery pack of claim 1, wherein the cell connection part is configured to connect the terminal access parts in a connection state to connect the battery cells in the predetermined connection state.

3. The battery pack of claim 2, wherein the FPCB forms a bending space that is bent and a non-bending space that is not bent according to a stacked state of the battery cells, wherein the battery protection circuit is mounted in the non-bending space formed on the FPCB.

4. The battery pack of claim 2, wherein the connection path pattern is changed according to the predetermined connection state to which the battery cells are connected.

5. A method of manufacturing a battery pack, the method comprising:

a cell arrangement operation of arranging battery cells in a predetermined arrangement so that each electrode terminal of at least two battery cells faces a flexible printed circuit board (FPCB);

a terminal access part forming operation of welding electrode terminals of the battery cells to the FPCB to form terminal access parts, each of which is a connection area with each battery cell, on the FPCB;

a cell connection part forming operation of forming a cell connection part connecting the terminal access parts to the FPCB in a connection state so as to connect the battery cells in a predetermined connection state;

a protection circuit connection part connection operation of connecting protection circuit connection parts to protection circuit connection part connection areas, respectively, of the FPCB;

a cell stacking operation of stacking the battery cells in a stacked state in which the battery cells are to be stacked while connecting the battery cells in the predetermined connection state through the terminal access part forming operation and the cell connection part forming operation; and a protection circuit connection operation of connecting the battery protection circuit to the protection circuit connection parts connected to the FPCB in the protection circuit connection part connection operation, and interconnecting the battery cells and the battery protection circuit, wherein the forming of the cell connection part in the cell connection part forming operation comprises forming a connection path pattern connecting the terminal access parts formed on the FPCB, wherein the cell connection part extending from at least one of the terminal access parts includes at least three line connections that connect to at least three other terminal access parts, respectively, and wherein a number of the protection circuit connection parts vary according to a number or an arrangement of the at least two or more stacked battery cells that are connected to the FPCB, and locations and a number of the protection circuit connection part connection areas vary according to a location of the battery protection circuit or the arrangement of the at least two or more stacked battery cells that are connected to the FPCB.

6. The method of claim 5, wherein according to the state of stacking the battery cells in the cell stacking operation, the FPCB forms a bending space that is bent and a non-bending space that is not bent, wherein the method further comprises a protection circuit mounting operation of mounting the battery protection circuit connected in the protection circuit connection operation in the non-bending space formed on the FPCB.

7. The method of claim 5, wherein the cell connection part formed in the form of the connection path pattern varies depending on the connection state to which the battery cells are to be connected.

8. The method of claim 5, wherein the cell arrangement operation comprises arranging the battery cells to face each other based on the FPCB.

9. The method of claim 5, wherein the cell arrangement operation comprises arranging the battery cells in a line based on the FPCB.

10. The method of claim 5, wherein the predetermined connection state is one of a serial connection state or a parallel connection state.

11. The battery pack of claim 1, wherein the predetermined connection state is one of a serial connection state or a parallel connection state.

12. The method of claim 5, wherein the at least three other terminal access parts have a different polarity from that of the at least one of the terminal access parts.

13. The battery pack of claim 1, wherein the at least three other terminal access parts have a different polarity from that of the at least one of the terminal access parts.

14. The battery pack of claim 1, wherein the number of the protection circuit connection part connection area is greater than the number of the at least two or more stacked battery cells that are connected to the FPCB.

15. The method of claim 5, wherein the number of the protection circuit connection part connection area is greater than the number of the at least two or more stacked battery cells that are connected to the FPCB.

\* \* \* \* \*